United States Patent
Bernhard et al.

(10) Patent No.: US 7,818,889 B2
(45) Date of Patent: Oct. 26, 2010

(54) TARGET OBJECT USED FOR RETROREFLEXION OF OPTICAL RADIATION

(75) Inventors: Heinz Bernhard, Berneck (CH); Jürg Hinderling, Marbach (CH); Marco Petermann, Grossolbersdorf (DE)

(73) Assignee: Leica Geosystems AG, Heerbrugg (CH)

( * ) Notice: Subject to any disclaimer, the term of this patent is extended or adjusted under 35 U.S.C. 154(b) by 55 days.

(21) Appl. No.: 12/441,826

(22) PCT Filed: Sep. 27, 2007

(86) PCT No.: PCT/EP2007/008405
§ 371 (c)(1),
(2), (4) Date: Mar. 18, 2009

(87) PCT Pub. No.: WO2008/043436
PCT Pub. Date: Apr. 17, 2008

(65) Prior Publication Data
US 2009/0260240 A1 Oct. 22, 2009

(30) Foreign Application Priority Data
Oct. 6, 2006 (CH) .................................... 1591/06

(51) Int. Cl.
*G01C 15/06* (2006.01)
*G02B 5/122* (2006.01)
(52) U.S. Cl. ........................................................ 33/293
(58) Field of Classification Search .................... 33/293
See application file for complete search history.

(56) References Cited

U.S. PATENT DOCUMENTS

| 2,763,000 A | 9/1956 | Graham |
| 3,039,093 A | 6/1962 | Rockwood |
| 3,834,789 A * | 9/1974 | Brudy ........................ 359/531 |
| 4,416,509 A | 11/1983 | Milan |
| 4,551,726 A | 11/1985 | Berg |
| 4,875,760 A | 10/1989 | Youngren et al. |

(Continued)

FOREIGN PATENT DOCUMENTS

DE 10209895 A1 9/2002

(Continued)

OTHER PUBLICATIONS

Nobuo Sugimoto et al, "Retroflector with acute dihedral angles" Optics Letters, OSA, Optical Society of America, Washington DC, US vo. 19, No. 20, Oct. 15, 1994, pp. 1660-1662.

*Primary Examiner*—Christopher W Fulton
(74) *Attorney, Agent, or Firm*—Workman Nydegger

(57) ABSTRACT

A target object (1a) used for retroflexion of optical radiation comprises at least six triple prisms (p1, p2), combined to give a 360 degree reflector which can be arranged on a geodetic measuring pole (6). The triple prisms (p1, p2) forming the 360 degree reflector are arranged in such a manner as to leave a clearance in the center of the 360 degree reflector for accommodating a section (6a) of the measuring pole (6). The prisms are also arranged in such a manner that the virtual images of the triple prism tips lie substantially in one plane perpendicular to a reference axis (10) that runs through the center of the 360 degree reflector and in parallel to the longitudinal direction of the measuring pole (6).

18 Claims, 5 Drawing Sheets

U.S. PATENT DOCUMENTS

| | | |
|---|---|---|
| 5,097,265 A | 3/1992 | Aw |
| 5,301,435 A * | 4/1994 | Buckley .................. 33/293 |
| 5,392,521 A * | 2/1995 | Allen ..................... 33/293 |
| 5,946,135 A * | 8/1999 | Auerswald et al. ......... 359/529 |
| 6,185,055 B1 * | 2/2001 | Feist .................... 359/831 |
| 2003/0021028 A1 | 1/2003 | Canning |
| 2008/0229592 A1 * | 9/2008 | Hinderling et al. ........ 33/293 |

FOREIGN PATENT DOCUMENTS

| | | |
|---|---|---|
| EP | 1645846 A1 | 4/2006 |
| WO | 90/00719 | 1/1990 |
| WO | 97/08572 | 3/1997 |
| WO | 98/44363 | 10/1998 |

* cited by examiner

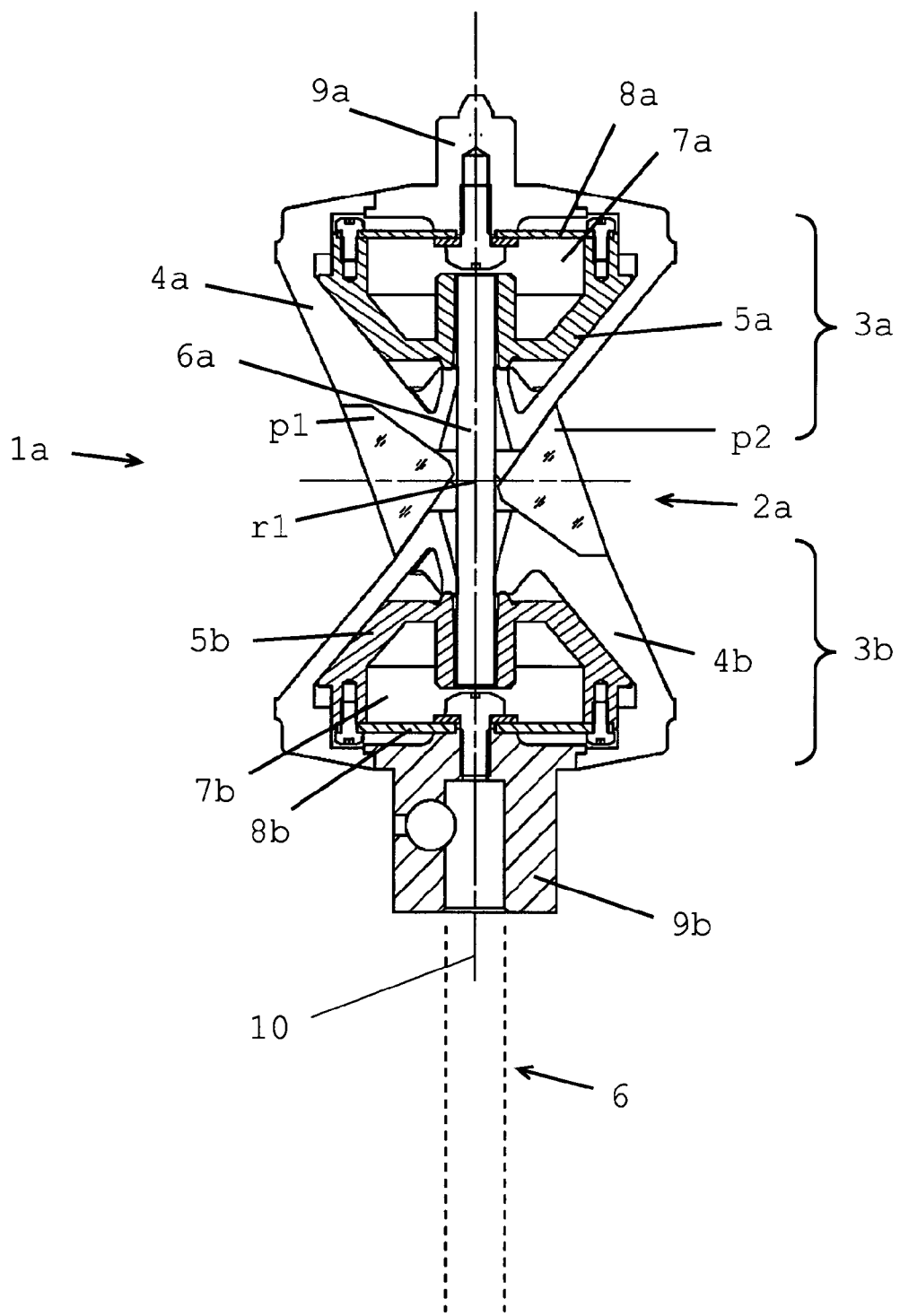
Figur 1

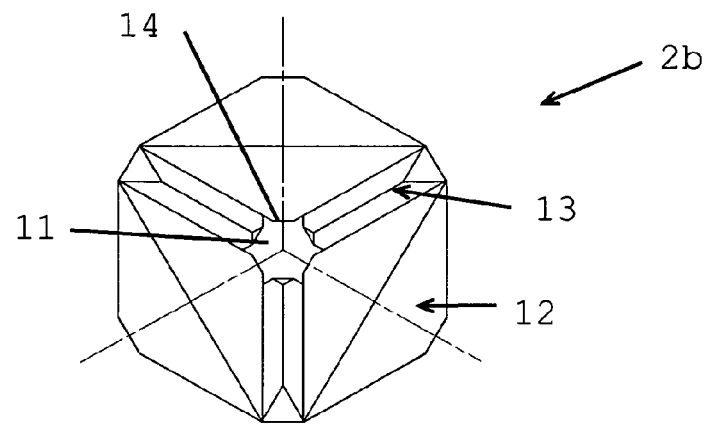
Figur 2
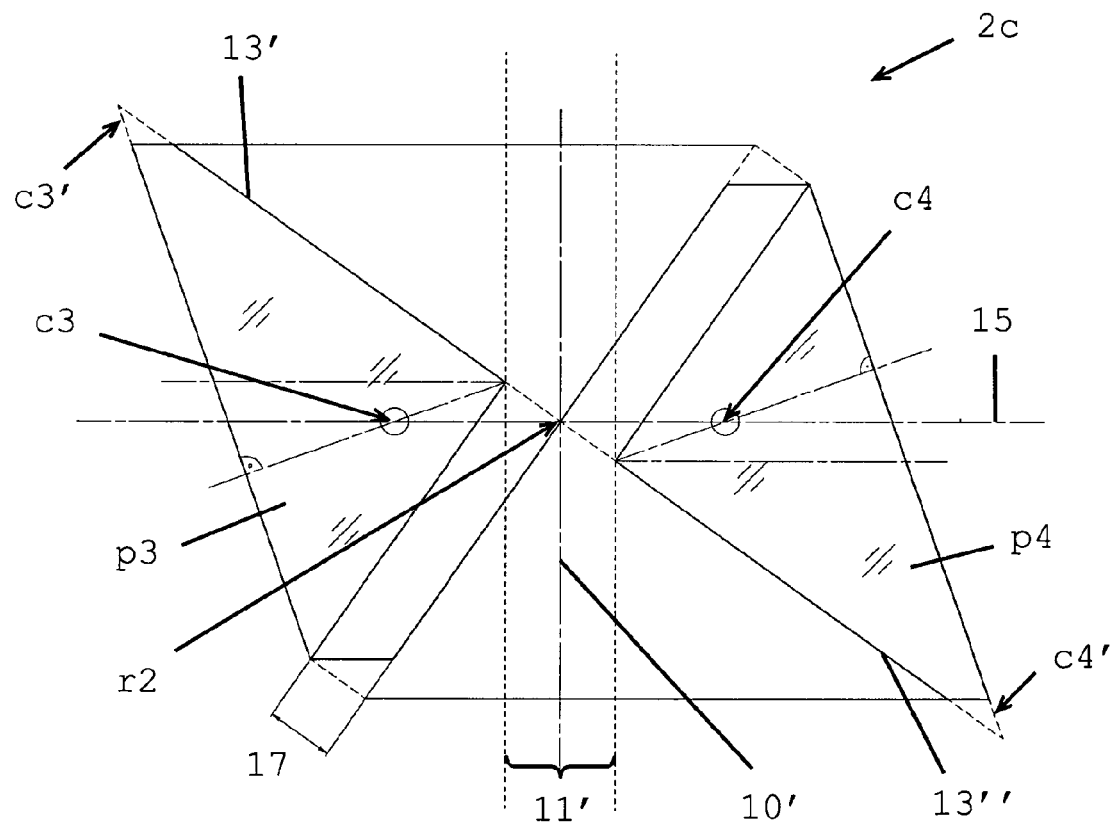
Figur 3

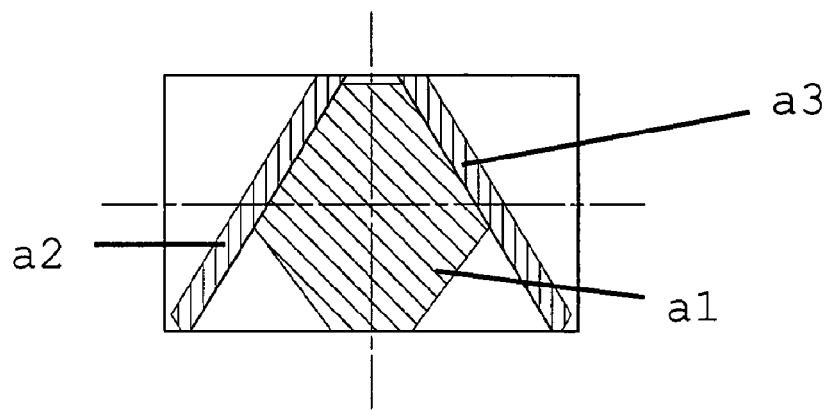
Figur 4a
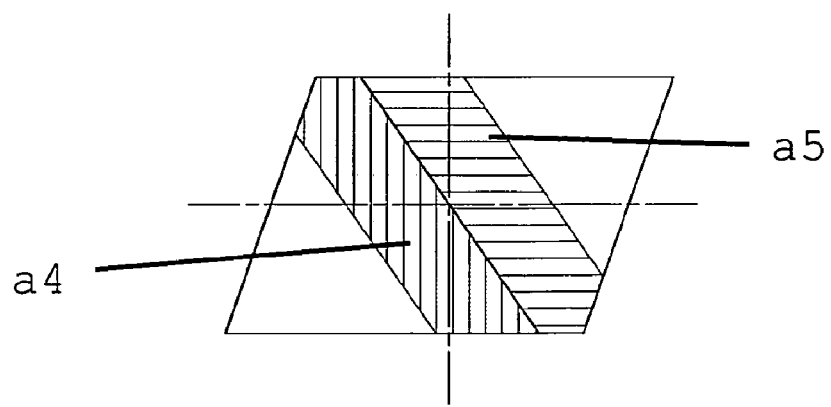
Figur 4b

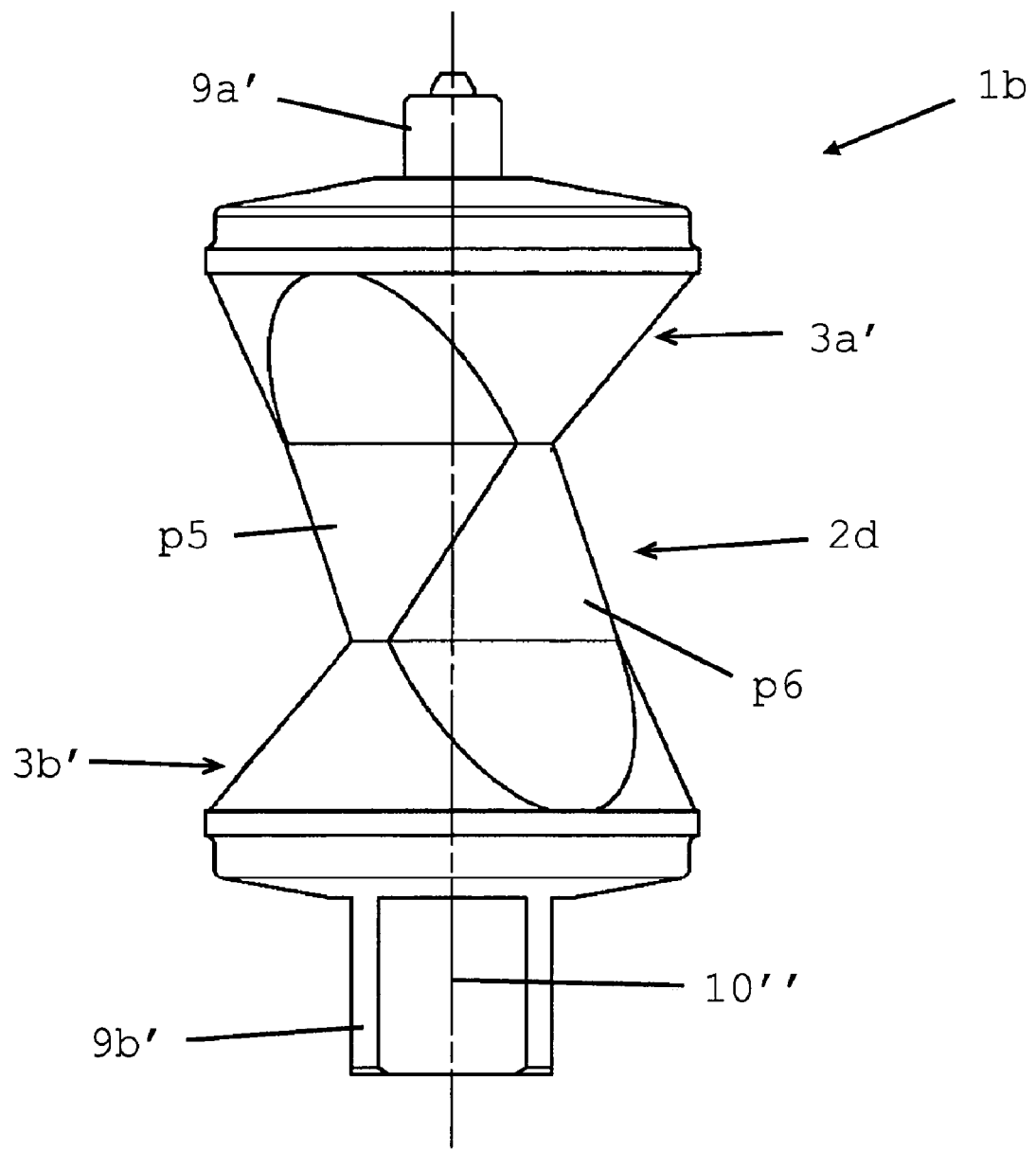
Figur 5

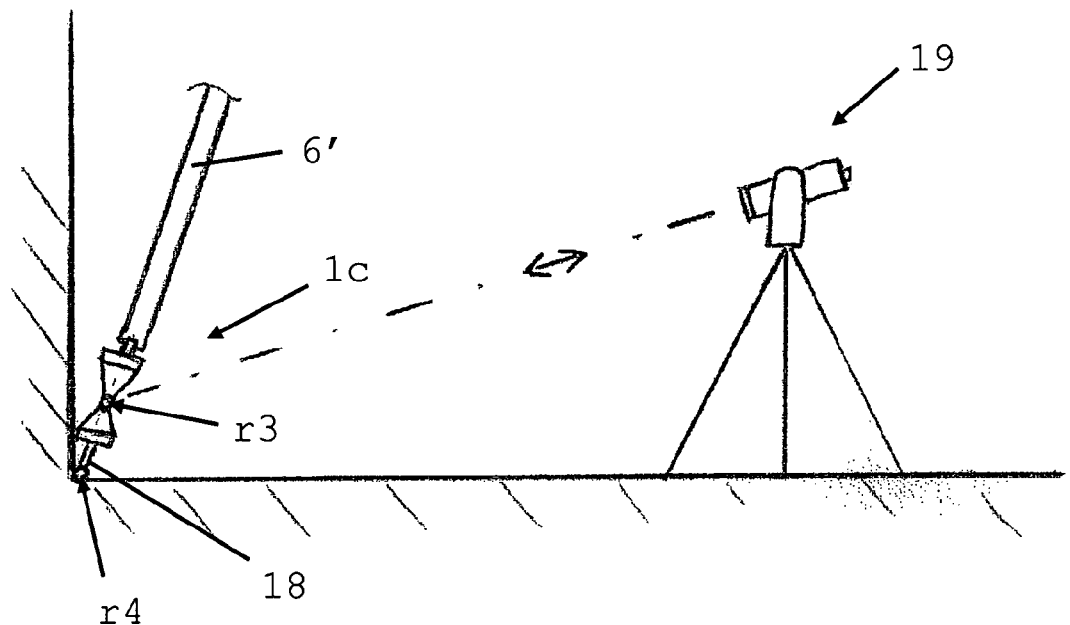
Figur 6
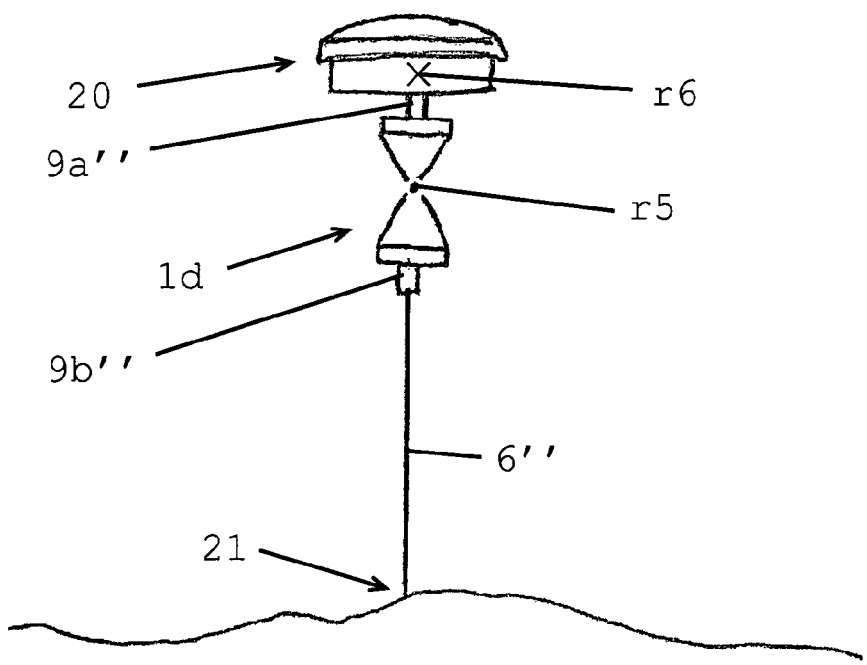
Figur 7

TARGET OBJECT USED FOR RETROREFLEXION OF OPTICAL RADIATION

The invention relates to a target object for retroreflection of optical radiation an apparatus comprising such a target object and the use of a plumbing staff with a target object as a measuring probe.

Target objects reflecting optical radiation have long been used particularly in surveying for defining measured distances. It is usual to determine the distance and/or the direction or directions to the target object and optionally also the orientation thereof by means of suitable measuring instruments. It is also known to assign a positioning system, such as GPS, to the target object and thus to determine the position of the target object in space or relative to the positioning system.

Such a target object, which has a reflective element or a plurality of reflective elements, such as prisms or reflective films, for the reflection of radiation, is placed for example—particularly in geodetic and industrial surveying and construction surveying—at a point to be surveyed, which point is marked in this manner by means of the target object and surveyed via the target object. For this purpose, the target object is positioned in a predetermined position relative to the point to be surveyed. The target object has for this purpose, for example, a plumbing staff for placing and positioning thereof at the appropriate target point. By means of a measuring instrument, such as a theodolite or tachometer, the position of the target object is measured and the position of the point is derived therefrom. In order to ensure a desired orientation of the target object relative to the measuring instrument, an orientation indicator, e.g. a spirit level, is also often mounted on the plumbing staff.

Further applications for such target objects are to be found in the construction of traffic routes, where the route is set out by means of a plumbing staff having a reflective element, and in machine guidance, where a target object or a plurality of target objects is mounted on a machine and tracked by means of a measuring instrument.

For the various applications, it has proved to be particularly advantageous to form target objects in such a way that they can be sighted and surveyed from more than only one direction, advantageously from all directions. Thus, the surveyor who carries the target object and erects it at different points need not ensure correct orientation relative to the measuring instrument each time he erects it. Furthermore, often the same fixed point is measured in surveying processes with changing instrument setups, the target objects positioned at the fixed points being sighted from different directions. In the construction of traffic routes—for example in the construction of road tunnels—measurements are carried out to one and the same measuring point or the target object, often from substantially opposite directions, reorientation of the target object in each case being undesired. A target object which can be surveyed from a large angle range, in particular 360 degrees, is also desirable for the surveying of moving objects.

The simplest case of such a target object is a target object having a spherical reflector which, however, is limited with respect to its potential uses since spherical reflectors can survey only over small distances. Various target objects with so-called 360 degree or all-round reflectors are known for measurements over large distances too.

Thus, U.S. Pat. No. 4,875,760 describes an arrangement comprising a multiplicity of individual prisms which are mounted on a holding body and distributed over an azimuthal angle range of 360°. However, the prisms act as individual prisms with "reflection holes" in between—an arrangement which reflects radiation from any direction of incidence around the arrangement is not provided. Moreover, particularly in the case of oblique sightings with large vertical angles onto the arrangement, errors occur in the determination of the height of a measuring point.

EP 0 846 278 describes a 360° reflector having a plurality of triple prisms. The triple prisms are arranged in such a way that the lateral surfaces of adjacent triple prisms touch one another, with the result that, on passage of the retroreflection from one triple prism to the adjacent triple prism, the pupils of the adjacent prisms at least partly touch. The arrangement thus acts as an all-round reflector which reflects light from all directions of incidence.

FIG. 5 of the patent shows the all-round reflector in a holder. The holder has an adapter for coupling to a retaining device, such as a tripod or plumbing staff, via which retaining device a use as a target object for measuring points is facilitated. The all-round reflector is, however, less suitable for measurements at close range since the measurements are falsified over small distances owing to interfering reflections.

U.S. Pat. No. 4,416,509 discloses a reflector having triple prisms for measuring flow parameters in bodies of water, an arrangement comprising two prism circles of six cylindrically arranged prisms each being described. However, the lateral surfaces of adjacent prisms do not touch one another but only the vertices. Consequently, firstly the designs of the prism circles are increased in size in a disadvantageous manner and secondly also the spacings of the prism tips, which altogether leads to inaccuracies of measurement with respect to lateral and height position measurements and distance measurements.

DE 102 09 895 describes an all-round reflector comprising an arrangement of eight triple prisms in the form of two pyramids which are directed with their base services towards one another. As a result of the special arrangement of the triple prisms, interfering reflections, in particular double reflections, in the horizontal angle range are reduced. However, in the case of large vertical angles deviating from the horizontal plane, interfering reflections are still present, which constitutes a significant troublesome factor particularly in the case of automated guidance and control of construction machines. In order to form a positionable target object, a holding part on which a plumbing staff can be mounted is arranged on the prism arrangement. The holding part is mounted from below directly on the prism arrangement, which leads to considerable forces acting on the fragile triple prisms, for example when the plumbing staff is set down roughly on a surface.

A disadvantage common to the described arrangements from the prior art is their sensitivity with respect to damage to the reflecting elements, usually formed from glass, by external mechanical effects. The sensitivity is due in particular to the fact that the arrangements for all-round reflection of the radiation have to be formed with glass parts whose light entry surfaces cover a 360° azimuthal angle range, without external protective devices. For holding the glass parts, most arrangements have holding parts which are connected directly to the glass parts, with the result that the action of external forces is transmitted to the fragile glass parts.

Since the target object is often used in such a way that it is setup and moved by a surveyor in the terrain, the target object should be hand-held and portable and therefore as light as possible. Holding devices, such as plumbing staffs, having a low weight are therefore usually used. The high weight of the reflector arrangement and the low weight of the plumbing staff result in an unbalanced target object which easily falls over, and the sensitive glass parts can easily break. This problem occurs to an even greater extent in the case of the more and more frequent design of a target object in which the reflector arrangement additionally carries a GPS. In the construction of traffic routes, where the target objects are mounted on construction machines, considerable forces also act on the target objects owing to vibrations, which leads to oscillations and in particular places considerable stress on the connection between holding part and reflector arrangement.

It is the object of the invention to eliminate deficiencies of the prior art.

This object is achieved, according to the invention, or the solutions are further developed by the subjects of Claims 1, 13, 14 and of the dependent claims, respectively.

The basis of the invention is that triple prisms are arranged as reflective elements of a target object for retroreflection of optical radiation, in such a way that an all-round reflector having a clearance in the centre for holding a part of a plumbing staff is realised. The arrangement of the triple prisms is furthermore effected in such a way that the virtual images of the triple prism tips lie substantially in the same plane. The formation of the central clearance for the plumbing staff permits more balanced and more stable mounting of the prism ring on a holding device, such as a plumbing staff. A holding device for placing and optionally accurate positioning of the target object is designated as a plumbing staff. Part of a plumbing staff is to be understood as meaning a component coordinated indirectly with the plumbing staff, such as an element detachably connected to the plumbing staff, or a directly coordinated component, such as a part—e.g. the upper third—of a one-piece plumbing staff.

By means of the arrangement in which the virtual images of the prism tips all lie in substantially one plane, height errors of the reflector—errors in the measurement of the angle of elevation—and position measurement—are greatly reduced, in particular in the case of sighting angles close to this plane. With a compact design of the prism ring, which is realised, for example, by nesting the prisms as closely as possible together so that the lateral surfaces of the prisms touch one another in pairs and/or combining a small number—e.g. six or eight—of prisms to form a ring, the height errors can be kept low even in the case of oblique sightings. The prism tips of such a compact prism arrangement are close to a reference axis of the target object, which reference axis passes through the centre of the prism arrangement—of the prism ring. A prism tip is to be understood as meaning the common point of intersection of the three mirror planes of the prism retroreflector. If the prism tips of the prism arrangement of the target object lie as close as possible to the reference axis, a reduction in the height error in position and angle of the target object to be surveyed is achieved even in the case of oblique sightings outside the horizontal plane.

The plane in which the virtual images lie is perpendicular to the reference axis. The plumbing staff or a part thereof can be arranged in the central clearance of the ring. The plumbing staff axis is then parallel to the reference axis; in particular, it coincides with the reference axis.

The triple prisms are arranged in an annular or circular manner so that the entry surfaces of the prisms form so to speak an outer circumferential surface region of the prism ring. The ring comprises at least six, in particular rotationally symmetrical and identically formed, triple prisms. With six triple prisms, substantially closed cohesive circumferential surface can be formed. The ring may also comprise eight or ten triple prisms, but the circumferential surface becomes increasingly fissured with increasing number of prisms. The prism tips are directed towards the reference axis through the centre. Because the inward-pointing prism tips are ground off, the clearance in the centre of the ring is increased in size while the outer circumference of the ring remains the same. With prism tips formed in such a manner as broken-off vertices, the all-round reflector can additionally be better sighted since this improves the visibility of the reflection centre of the reflector, which is advantageous in particular for manual sighting.

In a further development of the invention, the triple prisms are formed from a glass having a higher refractive index compared with the customarily used glass. For example, glass having a refractive index $n \geq \sqrt{3}$ is used. Further properties of the all-round reflector can be realised and/or improved by the choice of the glass.

Thus, firstly interfering reflections, in particular dual ridge reflections, can be greatly reduced by the appropriate choice of the prism material. The formation of the prisms from glass having a refractive index of $n \geq \sqrt{3}$ can even completely eliminate these interfering dual reflections since there is no longer an appropriate reflection condition for the total angle range to the entry surface. This reduction or elimination of an interfering reflection which can simulate an apparent movement of the target object is a decisive advantage in particular for the use of automated measuring instruments having an ATR (automatic target recognition) function.

The addition constant of the all-round reflector is further advantageously adjustable by the choice of the glass. The addition constant or reflector constant is the correction value which is required for the measurement and by means of which a measured distance can be related to the reference axis and independently of refractive index, shape, thickness and arrangement of the reflector elements. Each reflector type has a reflector-specific addition constant. Customary measuring instruments have data processing software by means of which addition constants for specific reflector types are provided, which is selected for the reflector type used in each case and taken into account in the data evaluation. The user must adapt the instrument configuration to the reflector, which is frequently forgotten, inevitably resulting in incorrect measurements.

In a further development of the invention, prism material, prism dimensions and prism arrangement are now chosen so that the all-round reflector formed by the prism ring has an addition constant which corresponds to the addition constant of a reflector of the same type or a known reference reflector used with commercially available measuring instruments and additionally meets the requirement with regard to a high—geodetically relevant—accuracy of position measurement. In particular, the addition constant can be set with respect to a standard addition constant provided as standard in many measuring instruments. This provides a novel all-round reflector which is compatible with "old" measuring instruments so that no conversion or upgrading of the measuring instruments is required.

Furthermore, the triple prisms are advantageously arranged as a ring in such a way that the lateral surfaces of adjacent prisms rest against each other and the free openings of adjacent prisms are in contact with one another. This arrangement reduces the signal variations for different directions, so that no azimuth-dependent range and/or accuracy differences occur for distance measurements. The accuracy of measurement both in the horizontal and in the vertical angle and position measurement is improved in this manner. Furthermore, two or three free openings—and hence altogether a larger free prism opening—are visible with the adjacent free openings of the individual prisms for the measuring instrument in each orientation of the target object or for each sighting direction in a horizontal angle range of 360° around the target object, which is particularly advantageous, for example, for automatic target recognition (ATR) since the measuring instrument detects a larger and integratively more position-stable image overall and the automatic target recognition is thus more robust and more accurate. The cross-section of all beams reflected in the direction of interest and the result of all apertures in the corresponding beam propagation direction are designated as free opening or free prism opening. The free prism opening of the all-round reflector may consist of a plurality of adjacent free openings coordinated with the individual prisms.

The triple prisms of the prism ring are connected firmly to one another in a planar manner. The connection is made, for example, by cementing, adhesive bonding or diffusion welding. The comparatively larger adhesion surfaces permit a scratch-resistant and very stable connection.

For holding the ring designed to be dimensionally stable and compact in this manner, the target object has a mount or holder. The mount is designed in two parts with an upper and lower mount body which in each case have a clearance for receiving the part of the plumbing staff. The prism ring/prism circle can then be arranged between the two mount bodies in such a way that no obscuring of the prism entry surfaces by the mount occurs. A horizontal angle range of 360 degrees is thus visible. Prism ring and mount are advantageously furthermore designed and arranged in such a way that a specifiable vertical angle range, in particular of at least +/−45 degrees, is visible.

In an advantageous further development of the invention, the mount is formed for shock-proof mounting of the prism ring—of the all-round reflector. For this purpose, the mount is designed in such a way and the glass ring is held in the mount in such a way that no or scarcely any force transmission to the glass ring occurs if an external force or torque acts—for example when the target object falls over.

This shock-proof mounting is realised in an embodiment by holding the triple prisms, combined in an annular manner to give the all-round reflector, so that they float in the mount having two mount bodies. The mount bodies each have a receptacle for a part of the plumbing staff. In this case, that part of the plumbing staff which is held in the mount is a plumbing staff element which is provided as a force-transmitting connection between the two mount bodies.

In an embodiment, the mount bodies are formed at least partly from a resilient, for example rubber-like, material and represent a mount in the form of a double cone. In this context, double cone is to be understood as meaning a shape which is roughly conical in contour, such as, for example, including a pyramidal shape. For example, the shape of the mount bodies resembles hexagonal pyramids. In the description of the invention, a shape where the template—the curve of the conical section—is closed but may have any shape is designated as cone-like or conical. Pyramids having templates with n vertices are accordingly likewise to be understood as meaning conical bodies. In general, the mount bodies are preferably in the form of double cones so that they do not extend very much in the region of the prism ring, in particular have an outer circumference substantially corresponding to the outer circumference of the prism ring, and extend further in the direction away from the prism ring. This ensures that, if the target object falls over, it falls on the mount and not on the prism ring. It is of course possible in principle to use a mount of any design which should advantageously fulfil the two conditions that the prisms are not obscured by the mount and the prism ring is protected by the mount in the event of falling over.

The plumbing staff element representing a force-transmitting, in particular dimensionally stable, pole is held firmly in the receptacles which are formed centrally in the mount bodies by clearances. For example, the plumbing staff element is connected to the mount bodies in the receptacles or said element is clamped in the receptacle. In this embodiment, the part of the plumbing staff is thus led as a plumbing staff element centrally from the upper mount body through the prism ring to the lower mount body. If appropriate, a plurality of connecting elements arranged in particular parallel to the reference axis through the centre of the ring can also be provided as the part of the plumbing staff.

Such a configuration ensures that an external impact very probably affects not the prism ring but the mount, and the impulse is transmitted via the plumbing staff element to both mount bodies. The glass ring is shielded by the floating receptacle from the destructive change of momentum. The force-transmitting connection between the two mount bodies—the plumbing staff element—advantageously comprises hard and resilient material so that no plastic deformation occurs. In an advantageous embodiment, the mount bodies also have shock-absorbing elements, such as membranes, at both ends. External action of force then affects one of the membrane-like, shock-absorbing elements and is damped before being transmitted to the two rigidly connected mount bodies and is damped while the triple prism ring held in a floating manner in the mount is substantially decoupled from the force-transmitting effect.

That part of the plumbing staff which is provided as the force-transmitting element is formed from a high-strength material. For example, the part is formed from carbon fibres and/or composite material or spring steel tempered to high strength.

For an embodiment of the invention, as described above, the plumbing staff is in the form of a plurality of parts. A plumbing staff having separate plumbing staff regions, one region representing the part held in the all-round reflector, has an adapter for connection to the part. The plumbing staff regions are connected, for example, by plug, snap or screw connections. They may also fit one into the other and thus be adjustable in height by pushing one into the other.

The plumbing staff can also be integral. The integral plumbing staff can then be inserted through the clearance of the prism arrangement in such a way that it in turn acts as a force-transmitting element. An acting force is then, for example, transmitted away at one end to the surface on which the plumbing staff is placed. The plumbing staff can also be passed through the target object so that it projects to a greater or lesser extent at the top thereof.

Adapters—such as the abovementioned adapter for connection of plumbing staff regions—can be mounted at one or both ends on the—one-part or multipart—plumbing staff or on the mount, to which adapters holding devices and/or further assemblies for surveying, e.g. a GPS, can be coupled.

In an alternative embodiment, the mount may also be integral. The prism ring is adhesively bonded around this integral mount. A further embodiment envisages forming the above-described mount bodies with inner and outer components, the inner components having receptacles for the plumbing staff part and the outer components being provided for holding the prism ring in a floating manner. In a further alternative embodiment, inner and outer components are also provided, the inner components being formed from hard and resilient material, which has in particular a coefficient of expansion corresponding to the coefficient of expansion of the prism glass, and being firmly connected to the prism ring. The inner components firmly connected to the prism ring are mounted in a floating manner in further components of the mount or, for example, between the above-mentioned adapters—for example via O-rings.

The target object according to the invention is described in more detail below, purely by way of example, with reference to working examples shown schematically in the drawings. Specifically:

FIG. 1 shows an embodiment of a target object according to the invention in section;

FIG. 2 shows a prism ring of a target object according to the invention in plan view;

FIG. 3 shows a prism ring of a target object according to the invention in section;

FIG. 4 shows, in two partial figures, front views of a prism ring of a target object according to the invention;

FIG. 5 a target object according to the invention;

FIG. 6 shows the use of a plumbing staff with a target object according to the invention as a measuring probe;

FIG. 7 shows a device comprising a plumbing staff, a target object according to the invention and a GPS antenna.

FIG. 1 shows an embodiment of a target object according to the invention in section. A triple prism ring 2a in the form of an all-round reflector and comprising a plurality of triple prisms—of which only two triple prisms p1 and p2 are shown here—is held in a floating manner in a mount. The mount has two mount bodies 3a and 3b which are each conical and together are in the form of a double cone. Here, the two mount bodies 3a and 3b each comprise an elastomeric outer component 4a and 4b and a hard and resilient component 5a and 5b. Receptacles in which a part 6a of a plumbing staff 6 is held under initial stress are formed in the inner components 5a and 5b.

The part 6a of the plumbing staff 6 is in the form of a carbon rod and represents a connecting part between the mount bodies 3a and 3b. The plumbing staff 6, which is merely indicated by dashed lines, is connected indirectly to the part 6a via a lower adapter element 9b. An upper adapter element 9a is provided for indirect coupling of further components to the plumbing staff 6 or to the part 6a.

A first membrane holder 7a with a first membrane 8a is arranged in the upper region of the upper mount body 3a, and a second membrane holder 7b with a second membrane 8b is arranged in the lower mount body 3b in the lower region of the body. The membranes 8a and 8b are formed from spring steel.

The triple prism ring 2a floats on the elastomeric outer components 4a and 4b of the mount bodies 3a and 3b. To prevent the inner prism vertices opposite the light entry surfaces of the prisms from rubbing against the carbon rod on vibration of the target object 1a, a clearance can be provided between the triple prism ring 2a and the outer components 4a and 4b, which clearance is filled with a soft material, such as a rubber-like adhesive. A hermetically sealed, corrosion-resistant system can additionally be realised in this manner.

Because the triple prism ring 2a is mounted in a floating manner and the upper mount body 3a is connected to the lower mount body 3b via the carbon rod passed through the centre of the prism ring 2a, a frictional connection via the triple prism ring 2a is avoided. An impact on the target object 1a or vibrations thereof is or are damped via the shock-absorbing membranes 8a and 8b and transmitted via the carbon rod to the mount bodies 3a and 3b.

The plumbing staff 6 which comprises the plumbing staff part 6a carries the target object 1a arranged in a centred manner on the plumbing staff 6. For example, a GPS antenna can be held as a further component. In this embodiment, holding is effected via the upper adapter element 9a and the mount of the target object 1a. Upper adapter 9a, target object 1a, lower adapter 9b and plumbing staff 6 with part 6a all lie on the same reference axis 10 through the centre of the entire arrangement. Alternatively, a one-piece plumbing staff to whose upper end a further component can be indirectly or directly coupled could also be led through the target object.

A GPS antenna provides a further reference point for determining the coordinates of a measuring point. A first reference point r1 is formed by the all-round reflector—triple prism ring 2a. With two reference points, the measuring point can be surveyed even more accurately.

FIG. 2 shows a plan view of a prism ring 2b of a target object according to the invention. The prism ring 2b is composed of six rotationally symmetrical triple prisms. Because the prisms are adhesively bonded to one another in a planar manner, the ring is extremely stable. Adjacent prisms are rotated through 180° relative to one another and pushed towards one another in such a way that a clearance 11 forms in the centre of the ring and the virtual prism tips lie in a plane, which is clearly shown in the following FIG. 3. In the case of the six triple prisms shown, the triangular light entry surfaces 12 of three triple prisms are visible. The further three triple prisms are on the other hand displaced downwards relative thereto so that only the edges 13 and a part of the reflective rear surfaces of these prisms are visible in plan view. It is clearly evident here that the prism tips pointing towards the centre are in the form of broken-off vertices 14. The clearance 11 formed in the centre permits the passage of a plumbing staff part through the prism ring 2b. Electrical and/or optical connecting cables, such as fibre optic cables, can also be passed through the clearance 11. If, for example, a transmitter, a receiver or a measuring device is mounted on a target object according to the invention, a cable connection which does not obscure the prism ring 2b and also does not disturb the user with regard to the handling of the arrangement can be realised to said target object.

FIG. 3 shows a section through a prism ring 2c of a target object according to the invention. The manner in which the individual prisms are pushed towards one another is clearly evident here. In comparison with an arrangement in which all prism tips lie in the centre, the prisms p3 and p4 are pushed here along their edges 13' and 13'' towards one another in such a way that the clearance 11' is formed in the centre. Furthermore, the displacement 17 is effected so that the virtual prism tips all lie in the same plane 15 which is perpendicular to the reference axis 10' through the centre. The diagram shows that the virtual images c3 and c4 of the tips of the prism p3 and p4 shown lie in substantially the same plane 15. This provides an all-round reflector which gives substantially the same measured angle of elevation value for the same vertical angle of incidence in an angle range of 360° around the reflector—the height error of the reflector is reduced or eliminated. In the working example shown, the displacement 17 is 4.41 mm, and the clearance 11' is thus formed with a diameter of 7.2 mm. The prisms p3, p4 used have a prism height of 17.4 mm and a refractive index of n=1.75. For this embodiment, the height error is zero, i.e. is completely eliminated. If alternatively the settings are made as prism height=17 mm, refractive index=1.75, displacement=4 mm, the height error decreases to 0.16 mm. A clearance having a diameter of 6.53 mm is formed.

Measurements to the all-round reflector are based on the reference axis 10', which coincides with the plumbing staff axis. The centre of the prism ring 2c which lies on the reference axis 10' is a reference point r2 of the measurement. In order to be able to make this reference to the reference axis 10', a type-specific reflector constant is assigned to a reflector. On displacement of the prisms, this reflector constant changes. According to the invention, it is now intended to use triple prisms comprising a glass having a higher refractive index compared with customary reflector glasses having a refractive index of n≈1.5 as retroreflective elements of the all-round reflector. In the working example shown, the prisms are formed from glass having the refractive index of n=1.75. Together with the prism height, the reflector constant is set thereby in such a way that it corresponds to a reflector constant provided as standard in many measuring instruments. With n≧√3, the additional effect achieved is a reduction or even avoidance of interfering reflections and provision of an all-round reflector which is improved with respect to the accuracy of a coordinate determination and also for ATR devices.

In order to form a target object which is as insensitive as possible with respect to its handling, the prism ring 2c is arranged in a mount. The tips c3' and c4' of the respective prism light entry surfaces can be sunk in the mount or ground off so that the target object has no projecting vertices and edges.

The partial FIGS. 4a and 4b show front views of a glass ring—prism ring—of a target object according to the invention. The prism ring is formed according to the arrangement from FIG. 2 with six prisms. This arrangement permits the formation of a prism ring having a substantially closed, cohesive outer surface. FIG. 4a shows a front view in which the measuring instrument and/or the observer sights the entry surface of a prism of the ring frontally and perpendicularly. In FIG. 4b, the prism ring from FIG. 4a is rotated through a horizontal angle of 30 degrees—the view is onto the edge of adjacent prisms. The shaded areas show the respective free openings—which correspond to the cross-section of the beams reflected back to the measuring instrument—of the prisms. The measuring instrument sees two free openings a4 and a5 in the position—orientation—of the target object in FIG. 4b and three free openings a1, a2 and a3 in the position in FIG. 4a. As a result of the arrangement of the prisms, the free openings of adjacent prisms touch one another so that a substantially cohesive reflection surface is formed.

The diagram of FIG. 5 shows an outer view of a target object 1b according to the invention. The diagram shows in particular that the target object 1b forms an extremely compact and stable reflector unit. As a result of the double cone-like arrangement of the two mount bodies 3a' and 3b', the target object, on falling over, falls onto the mount bodies 3a' and 3b' and not onto the triple prism ring 2d arranged between the mount bodies 3a' and 3b'. The formation of the central clearance in the triple prism ring 2d and—at least partly—in the mount bodies 3a' and 3b' further increases the stability of the arrangement in that a plumbing staff part can be passed through the centre of the arrangement. The optical centre, the geometric centre of gravity and the centre of mass of the target object 1b all lie here on the same reference axis 10", which coincides with the plumbing staff axis. With an inserted part, the resilient mount bodies 3a' and 3b' and resilient, shock-absorbing membranes mounted symmetrically to the centre in the mount bodies 3a' and 3b'—as shown in FIG. 1—impacts and vibrations are absorbed and damped. The triple prism ring 2d is mounted in a floating manner in the mount bodies 3a' and 3b' and substantially decoupled from an acting force. The stable arrangement is furthermore advantageously realised by the central passage without any external obscuring of the triple prism ring 2d. Also readily evident in this diagram is that the triple prism ring 2d comprising six triple prisms here, only a first prism p5 and a second prism p6 of which are shown, has a substantially closed outer surface. An upper adapter element 9a' and a lower adapter element 9b' for coupling further components, such as holding and/or measuring devices, are also mounted on the target object 1b.

FIG. 6 shows a target object 1c according to the invention in a measuring probe application. A plumbing staff 6' is coupled to one end of the target object 1c and a probe tip 18 to the other end. A measuring probe could also be formed in a manner such that the plumbing staff 6' is passed completely through the target object 1c and projects as a probe tip at its upper end. With the short probe tip 18—in comparison with the plumbing staff 6'—the target object 1c can be set very precisely at a measuring point. The target object 1c is sighted and surveyed using a tachometer 19 with ATR function. On the basis of the survey, the coordinates of a first reference point r3 defined by the target object 1c are determined. A second reference point r4 is fixed by the probe tip 18, the coordinates of which are derived from the coordinates of the first reference point r3 and the positional relationship of the probe tip 18 to the first reference point r3, which relationship is determined by means of further sensors, such as tilt sensors and direction sensors, housed in the plumbing staff 6'.

FIG. 7 shows a device comprising a target object 1d according to the invention, a GPS antenna 20 and a plumbing staff 6". The target object 1d is coupled to the plumbing staff 6" via an adapter element 9b". The GPS antenna 20, too, is mounted on plumbing staff 6" by means of an adapter element 9a" so that the target object 1d, the GPS antenna 20 and the plumbing staff 6" lie on one and the same axis. The plumbing staff 6" is set up—for example by means of a tilt sensor—perpendicularly over a measuring point 21 and positions the target object 1c and the GPS antenna 20 at this measuring point 21. The coordinates of the measuring point 21 can, if required, be determined on the one hand from the known length of the plumbing staff 6" and an optical determination of the coordinates of a reference point r5 of the target object 1d and on the other hand from a determination of the coordinates of a reference point r6 of the GPS antenna 20 on the basis of satellite signals together with the height of the plumbing staff up to reference point r6. Owing to the advantageous arrangement of the components, the reference point r5 of the target object 1d and the reference point r6 of the GPS antenna 20 lie on the same reference axis, which coincides with the plumbing staff axis. As a result, the two methods for determining the position of the two reference points r5 and r6 can be easily combined and the coordinates of the measuring point 21 can be determined thereby with high geodetic accuracy.

The invention claimed is:

1. A target object for retroreflection of optical radiation, comprising:
   at least six triple prisms of the same type which are combined in an annular manner to form an all-round reflector, which all-round reflector is capable of being arranged on a geodetic plumbing staff, wherein:
      the centre of the ring formed by the triple prisms forming the optical centre of the all-round reflector;
      the triple prisms are in the form of triple prisms having in each case a triangular light entry surface;
      successive, adjacent triple prisms being rotated through 180° relative to one another, with in each case directly touching lateral surfaces; and
      the arrangement of the triple prisms is such that a clearance for receiving a part of the plumbing staff is present in the centre of the ring, in that the virtual images of the triple prism tips lie in each case substantially in a plane which is perpendicular to a reference axis passing through the centre of the ring and running parallel to the longitudinal extension of the plumbing staff.

2. A target object according to claim 1, wherein:
there are only six triple prisms of the same type; and
the triple prisms are in the form of substantially rotationally symmetrical triple prisms having in each case a substantially equilateral triangular light entry surface.

3. A target object according to claim 1, wherein the triple prism tips are in the form of broken-off vertices.

4. A target object according to claim 1, wherein the triple prisms consist of glass having a refractive index $n \geq \sqrt{3}$.

5. A target object according to claim 1, wherein the triple prisms are firmly connected to one another in a manner such that they are present in a stable ring.

6. A target object according to claim 1, wherein the triple prisms are cemented to one another in a manner such that they are present in a stable ring.

7. A target object according to claim 1, wherein—in a view onto the triple prism ring substantially in the direction of the plane perpendicular to the reference axis and passing through the centre of symmetry of the triple prism ring—the free openings of adjacent triple prisms are in contact with one another, and in the centroid of the area of all free openings is close to the centre of symmetry of the triple prism ring.

8. A target object according to claim 1, wherein the triple prism ring is held via a double cone-like mount, which mount has two conical mount bodies, in each case with a central clearance for receiving the part of the plumbing staff, the tips of the two mount bodies pointing towards the centre of the triple prism ring.

9. A target object according to claim 8, wherein the triple prism ring is held in a floating manner via a double cone-like mount consisting preferably of hard and resilient rubber material, which mount has two conical mount bodies, in each case with a central clearance for receiving the part of the plumbing staff, the tips of the two mount bodies pointing towards the centre of the triple prism ring.

10. A target object according to claim 8, wherein a filling comprising flexible and resilient material is provided for corrosion protection between triple prism ring and mount.

11. A target object according to claim 8, wherein the part of the plumbing staff extends through the centre of the mount and hence through the centre of the triple prism ring, which part consists of carbon fibers and/or composite material.

12. A target object according to claim 8, wherein the plumbing staff part is held in the mount, in particular with initial stress, in such a way that a force-transmitting connection is produced from one mount body to the other mount body via the part of the plumbing staff, and the triple prism ring is substantially decoupled from the force transmission.

13. A target object according to claim 8, wherein resilient, shock-absorbing elements are coordinated with the two mount bodies—at each of the two ends of the double cone-like mount.

14. A target object according to claim 8, wherein resilient, shock-absorbing elements in the form of membranes are coordinated with the two mount bodies —at each of the two ends of the double cone-like mount.

15. A target object according to claim 8, wherein a passage for receiving, for example, optical or electrical connecting cables is provided—additionally or alternatively to the plumbing staff part—through the centre of the mount and hence through the centre of the triple prism ring.

16. A target object according to claim 8 as a modular component for a plumbing staff, which is provided for receiving further components, including a GPS antenna, a further optical sighting device or a probe tip, the position of these components having a defined relationship with a reference point lying on the reference axis.

17. A device comprising:
a plumbing staff;
a target object including:
at least six triple prisms of the same type which are combined in an annular manner to form an all-round reflector, which all-round reflector is capable of being arranged on a geodetic plumbing staff, wherein:
the centre of the ring formed by the triple prisms forming the optical centre of the all-round reflector;
the triple prisms are in the form of triple prisms having in each case a triangular light entry surface;
successive, adjacent triple prisms being rotated through 180° relative to one another, with in each case directly touching lateral surfaces; and
the arrangement of the triple prisms is such that a clearance for receiving a part of the plumbing staff is present in the centre of the ring, in that the virtual images of the triple prism tips lie in each case substantially in a plane which is perpendicular to a reference axis passing through the centre of the ring and running parallel to the longitudinal extension of the plumbing staff; and
a GPS antenna, the plumbing staff, target object and GPS antenna being combined in such a way that the reference axis of the target object and the reference axis of the GPS antenna coincide with the axis of the plumbing staff, and reference points which are coordinated with the target object on the one hand and the GPS antenna on the other hand lie on this common axis.

18. A method comprising:
an act of performing a measurement using a plumbing staff with a target object mounted thereon as a measuring probe, the target object including:
at least six triple prisms of the same type which are combined in an annular manner to form an all-round reflector, which all-round reflector is capable of being arranged on a geodetic plumbing staff, wherein:
the centre of the ring formed by the triple prisms forming the optical centre of the all-round reflector;
the triple prisms are in the form of triple prisms having in each case a triangular light entry surface;
successive, adjacent triple prisms being rotated through 180° relative to one another, with in each case directly touching lateral surfaces; and
the arrangement of the triple prisms is such that a clearance for receiving a part of the plumbing staff is present in the centre of the ring, in that the virtual images of the triple prism tips lie in each case substantially in a plane which is perpendicular to a reference axis passing through the centre of the ring and running parallel to the longitudinal extension of the plumbing staff.

* * * * *